United States Patent
Matsuura et al.

(10) Patent No.: US 11,402,508 B2
(45) Date of Patent: Aug. 2, 2022

(54) DISTANCE-MEASURING SYSTEM AND DISTANCE-MEASURING METHOD

(71) Applicant: PANASONIC INTELLECTUAL PROPERTY MANAGEMENT CO., LTD., Osaka (JP)

(72) Inventors: Koji Matsuura, Kyoto (JP); Keiichi Mori, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 738 days.

(21) Appl. No.: 16/210,739

(22) Filed: Dec. 5, 2018

(65) Prior Publication Data

US 2019/0107626 A1 Apr. 11, 2019

Related U.S. Application Data

(63) Continuation of application No. PCT/JP2017/020670, filed on Jun. 2, 2017.

(30) Foreign Application Priority Data

Jun. 8, 2016 (JP) .............................. JP2016-114877

(51) Int. Cl.
*G01S 17/00* (2020.01)
*G01S 17/42* (2006.01)
(Continued)

(52) U.S. Cl.
CPC ............ *G01S 17/42* (2013.01); *G01B 11/026* (2013.01); *G01B 11/2518* (2013.01);
(Continued)

(58) Field of Classification Search
USPC ....................................................... 356/4.01
See application file for complete search history.

(56) References Cited

U.S. PATENT DOCUMENTS 6,473,619 B1 * 10/2002 Kong .................... G01S 5/0027
340/988
9,807,369 B2 * 10/2017 Usuda ................... G01S 17/023
(Continued)

FOREIGN PATENT DOCUMENTS

| JP | 2006267123 A | 10/2006 |
| JP | 2010-190675 A | 9/2010 |
| JP | 2014-109490 A | 6/2014 |

OTHER PUBLICATIONS

English Machine Translation of JP 2014-109490 (Year: 2014).*
(Continued)

*Primary Examiner* — James R Hulka
(74) *Attorney, Agent, or Firm* — McDermott Will & Emery LLP

(57) ABSTRACT

A distance-measuring system includes: a plurality of light sources; a light source controller that controls the plurality of light sources; an imager that generates a distance image for each reflection light emitted by the plurality of light sources and reflected by a subject; a reliability level output unit that outputs a reliability level for each distance image; and an image compositor that composites a plurality of distance images. The emission areas of the plurality of light sources which emit light at different angles relative to an optical axis of the imager have a common emission area to which light is emitted in common, and the image compositor exclusively selects pixels to be composited from the plurality of distance images for an outside of the common emission area, and determines pixels to be composited based on the reliability level for the common emission area to generate a composite distance image.

14 Claims, 14 Drawing Sheets

(51) Int. Cl.
  *G01S 7/481* (2006.01)
  *G01S 7/484* (2006.01)
  *G01S 7/487* (2006.01)
  *G01S 17/894* (2020.01)
  *G01B 11/02* (2006.01)
  *G01B 11/25* (2006.01)

(52) U.S. Cl.
  CPC .............. *G01S 7/484* (2013.01); *G01S 7/487* (2013.01); *G01S 7/4815* (2013.01); *G01S 17/894* (2020.01)

(56) References Cited

U.S. PATENT DOCUMENTS

| | | | | |
|---|---|---|---|---|
| 9,857,472 | B2* | 1/2018 | Mheen | G01S 17/87 |
| 2006/0245601 | A1* | 11/2006 | Michaud | G01S 5/22 |
| | | | | 381/92 |
| 2013/0261959 | A1* | 10/2013 | Kimishima | G01S 19/40 |
| | | | | 701/445 |
| 2013/0314641 | A1* | 11/2013 | Okuda | G09G 3/342 |
| | | | | 349/61 |
| 2014/0028804 | A1* | 1/2014 | Usuda | G01S 17/023 |
| | | | | 348/47 |
| 2015/0009485 | A1* | 1/2015 | Mheen | G01S 17/87 |
| | | | | 356/4.01 |
| 2016/0227496 | A1* | 8/2016 | Panteleev | H04W 60/00 |

OTHER PUBLICATIONS

Extended European Search Report issued in corresponding European Patent Application No. 17810230.7, dated May 20, 2019.
International Search Report and Written Opinion issued in International Patent Application No. PCT/JP2017/020670, dated Aug. 29, 2017; with partial English translation.

* cited by examiner

FIG. 4A
301
111 | 110 | 112

| 90 | 90 | 95 | 89 | | |
|----|----|----|----|---|---|
| 90 | 90 | 95 | 89 | | |
| 90 | 90 | 90 | 100 | | |
| 90 | 90 | 90 | 100 | | |

FIG. 4B
302
111 | 110 | 112

| | | 96 | 90 | 93 | 93 |
|---|---|----|----|----|----|
| | | 96 | 90 | 93 | 93 |
| | | 91 | 101 | 93 | 93 |
| | | 91 | 101 | 93 | 93 |

FIG. 4C
303
110

| 1, 2 | 2, 1 |
|------|------|
| 1, 2 | 2, 1 |
| 1, 2 | 2, 1 |
| 1, 2 | 2, 1 |

FIG. 4D
304
111 | 110 | 112

| 90 | 90 | 95 | 90 | 93 | 93 |
|----|----|----|----|----|----|
| 90 | 90 | 95 | 90 | 93 | 93 |
| 90 | 90 | 90 | 101 | 93 | 93 |
| 90 | 90 | 90 | 101 | 93 | 93 |

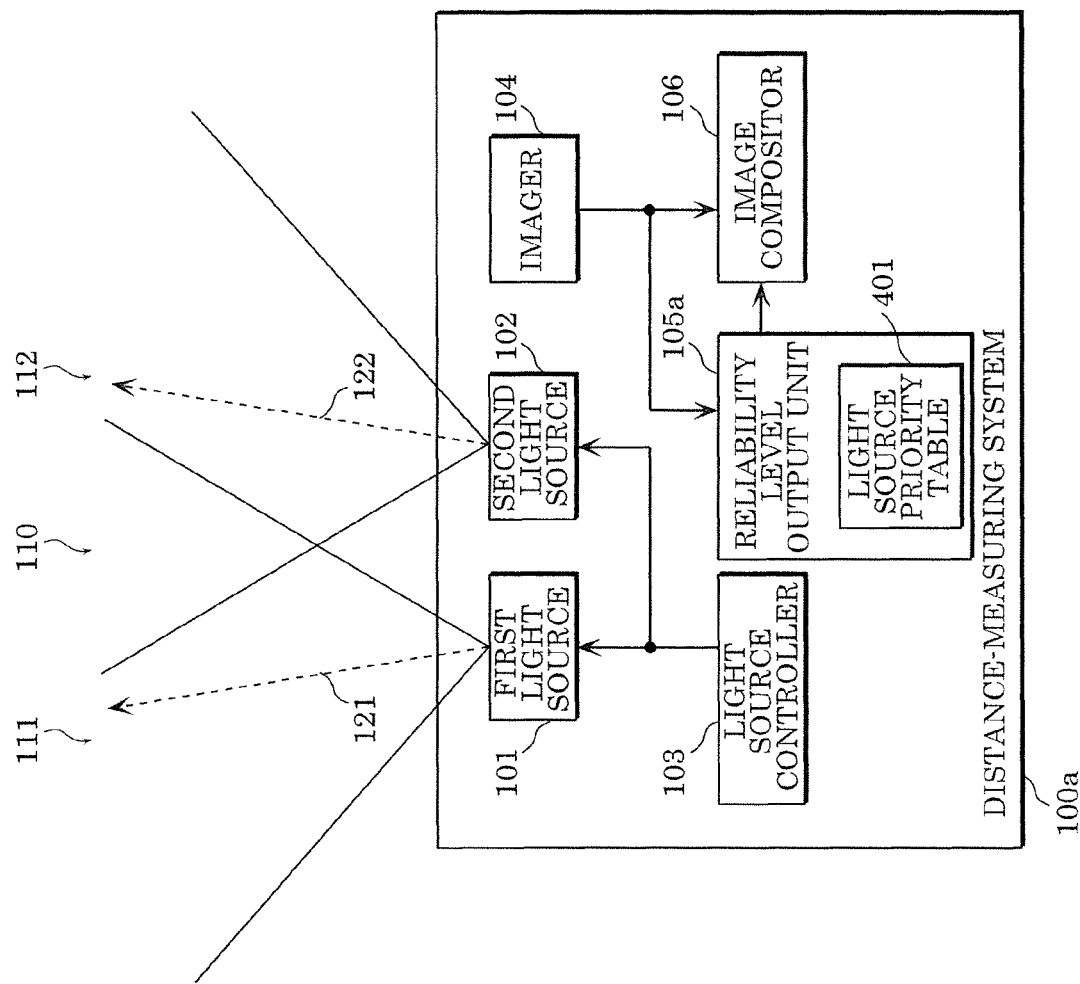

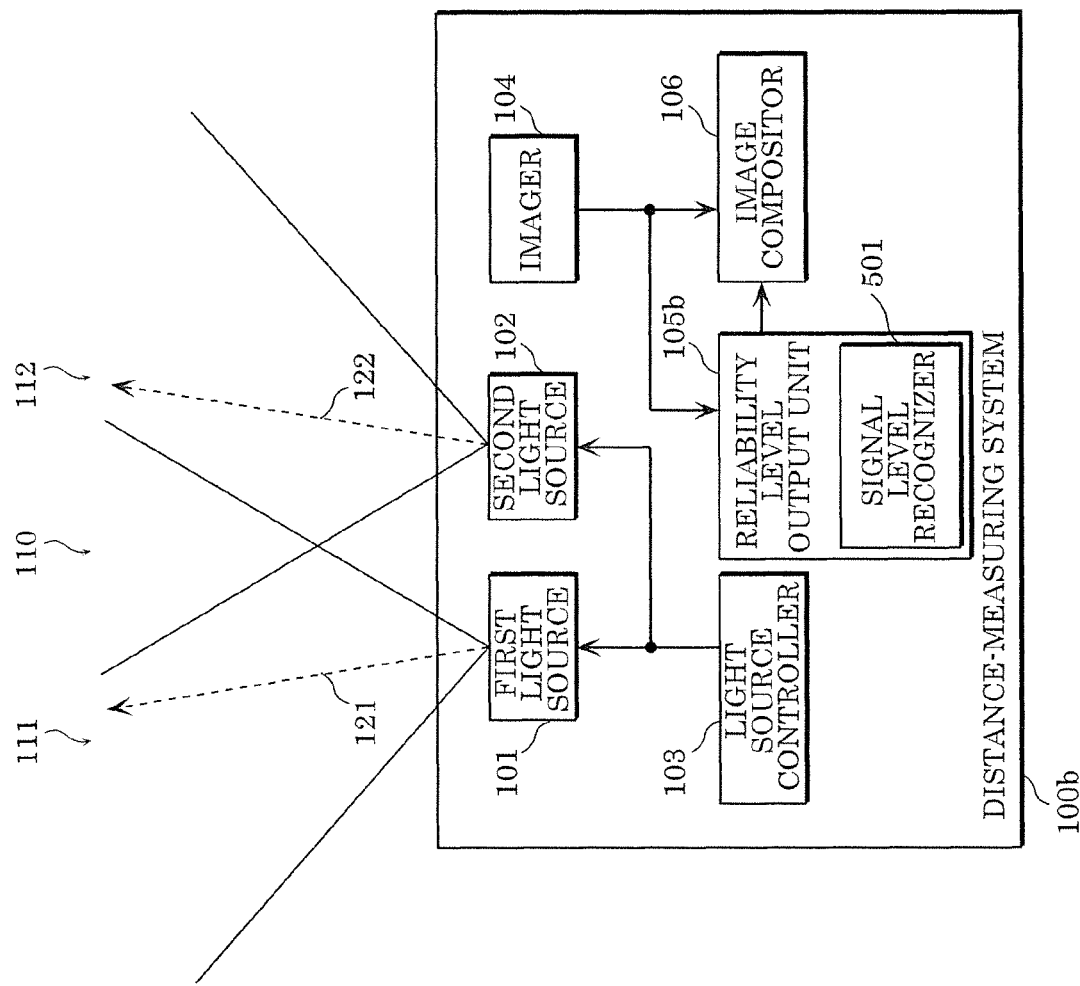

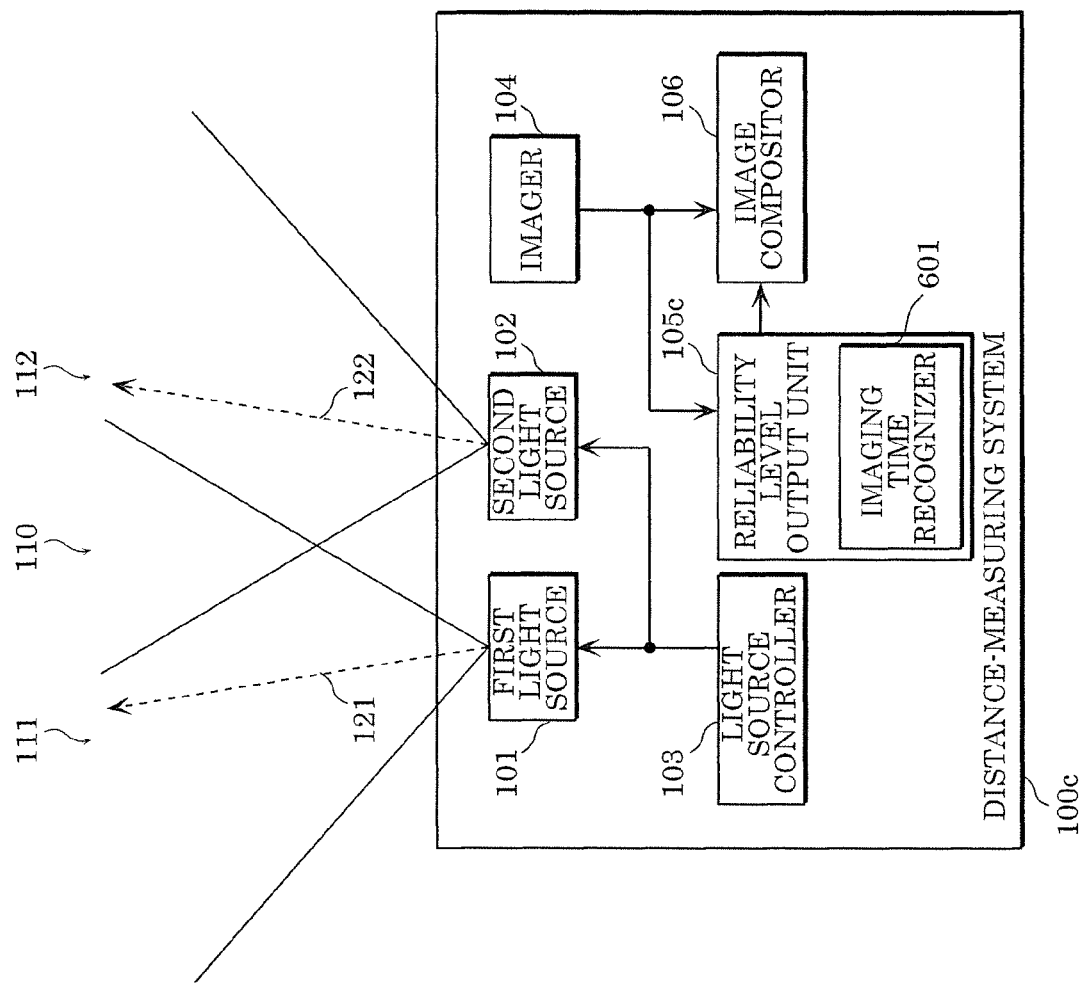

DISTANCE-MEASURING SYSTEM AND DISTANCE-MEASURING METHOD

CROSS REFERENCE TO RELATED APPLICATIONS

This application is a U.S. continuation application of PCT International Patent Application Number PCT/JP2017/020670 filed on Jun. 2, 2017, claiming the benefit of priority of Japanese Patent Application Number 2016-114877 filed on Jun. 8, 2016, the entire contents of which are hereby incorporated by reference.

BACKGROUND

1. Technical Field

The present disclosure relates to a distance-measuring system and a distance-measuring method that are capable of distance-measuring a subject from a short distance to a long distance.

2. Description of the Related Art

In recent years, many systems that measure a distance to a subject using a stereo camera or a time of flight (TOF) camera have been proposed. A stereo camera method is a method of calculating a distance to a subject from parallax information which is obtained by comparing images of the subject captured by two cameras disposed separated from each other. The method has a problem in that long distance distance-measuring is difficult, and distance-measuring at night is difficult.

In contrast, the TOF method is a method of calculating a distance to a subject by measuring a time taken for the light emitted by a camera to return to the camera after being reflected from the subject. In contrast to the stereo camera method, the TOF method is superior in long distance distance-measuring and distance-measuring at night as the characteristics. Also, a general TOF distance-measuring system has a characteristic that the greater the signal level of reflection light, the higher the accuracy of calculated distance information.

For instance, in the TOF distance-measuring system of Japanese Unexamined Patent Application Publication No. 2010-190675, a method is proposed in which multiple light sources are installed separated from each other, an image is captured while switching between the light sources successively, a distance image is generated for each of the light sources, and the distance image of a light source, for which the signal level of reflection light is the greatest, is selected.

SUMMARY

However, the method of Japanese Unexamined Patent Application Publication No. 2010-190675 has a problem in that although the distance accuracy is enhanced, the power consumption of the light sources is increased. In addition, there is a problem in that distance-measuring in a wide range from a short distance to a long distance is not taken into consideration.

In order to solve the above-mentioned problem, a distance-measuring system according to an aspect of the present disclosure includes: A distance-measuring system comprising: a plurality of light sources including at least a first light source and a second light source that emit light; a light source controller that controls timing and an emission period at which and during which the plurality of light sources emit light; an imager that exposes to reflection light emitted by the plurality of light sources and reflected by a subject at times and for exposure periods that are set individually for each of the plurality of light sources, and generates a plurality of distance images for the reflection light in emission areas to which light is emitted by the plurality of light sources, based on a quantity of electric charge of the reflection light, the distance images each indicating a distance to the subject; a reliability level output unit that outputs a reliability level for the distance for each of the plurality of distance images; and an image compositor that composites the plurality of distance images generated for the reflection light. the plurality of light sources emit light at different angles relative to an optical axis of the imager, the emission areas of the plurality of light sources have a common emission area as only part to which light is emitted in common, and the image compositor exclusively selects pixels to be composited from the plurality of distance images for an outside of the common emission area, determines pixels to be composited based on the reliability level for the common emission area, and generates a composite distance image.

With such a distance-measuring system, distance-measuring with a wide viewing angle is made possible for a short distance. Also, in a common emission area, distance information can be obtained for every frames, thus it is possible to enhance a noise reduction effect on the distance information by weighted average and a time series filter such as a Kalman filter. Therefore, the distance-measuring accuracy for a long distance can be increased by placing a long distance area with high noise components in the common emission area. Furthermore, light is not emitted simultaneously from all light sources for every frames, but light is emitted from only part of the light sources, thus the power consumption can be maintained at a low level.

In addition, in the distance-measuring system of the present disclosure, the reliability level output unit may include a light source priority table that defines a priority of each of the plurality of light sources for each of distance ranges, and may compare distance information indicating a distance for each pixel of the plurality of distance images with a value of the light source priority table, and may select and output the reliability level.

The distance range in which distance-measuring is possible can be changed by the intensity of the light sources and the characteristics of the optical waveform. Therefore, with the distance-measuring system as described above, even when a distance range in which measurement is possible and a distance range having a high distance-measuring accuracy are varied with light sources, an optimal distance information can be selected in each distance range, thus the distance-measuring accuracy can be increased.

In addition, in the distance-measuring system of the present disclosure, the reliability level output unit may include a signal level checker that checks signal levels of the reflection light, and the signal level checker may check the signal levels of the reflection light corresponding to the plurality of distance images, and may generate and output a higher reliability level for a greater signal level.

With such a distance-measuring system, distance information using reflection light having a higher signal level can be used, thus the distance-measuring accuracy can be increased.

In addition, in the distance-measuring system of the present disclosure, the reliability level output unit may include an imaging time checker that checks a time of generation of each of the plurality of distance images, and the imaging time checker may check the time of generation of each of the plurality of distance images, and may generate and output a higher reliability level for a newer time of generation.

With such a distance-measuring system, newer distance information can be used, thus even when a subject moves, distance-measuring can be performed with high accuracy.

In addition, in the distance-measuring system of the present disclosure, for the common emission area, the image compositor may select pixels to be composited from one of the plurality of distance images to generate a composite distance image, the one distance image having the reliability level which is highest.

With such a distance-measuring system, information with the highest reliability can be selected, thus the distance-measuring accuracy can be increased.

In addition, in the distance-measuring system of the present disclosure, for the common emission area, the image compositor may take a weighted average of pixels of the plurality of distance images using a value of the reliability level to generate a composite distance image.

With such a distance-measuring system, noise in distance information can be reduced by taking a weighted average of the pieces of distance information, thus the distance-measuring accuracy can be increased.

In addition, in the distance-measuring system of the present disclosure, the common emission area may be adjusted to be at a substantially center of the plurality of distance images.

Normally, a distant subject appears near the center of a captured image surface due to the distance between the distance-measuring system and the subject. Also, an optical lens used for an imager has the best characteristics at its central portion. Therefore, with the distance-measuring system as described above, a common emission area can be set for a distant subject, thus the distance-measuring accuracy of a distant subject can be increased.

In addition, in the distance-measuring system of the present disclosure, the light source controller may drive at least two of the plurality of light sources simultaneously.

With such a distance-measuring system, the intensity of light within the common emission area can be increased by driving the light sources simultaneously, thus the distance-measuring range within the common emission area can be extended.

In addition, the distance-measuring system of the present disclosure may further includes a number-of-light-sources-driven determining unit. The number-of-light-sources-driven determining unit may determine a number of light sources driven simultaneously based on a magnitude of the signal level of the reflection light, and may notify the light source controller of the number of light sources, and the light source controller may control driving of the plurality of light sources based on the number of light sources notified.

In a distance-measuring system that emits light to measure a distance, in general, when reflection light to which exposure is made is saturated, distance information cannot be calculated from the quantity of electric charge of the light. Also, when the signal level of the reflection light is low, the distance-measuring accuracy is reduced. Therefore, with the distance-measuring system as described above, even when the signal level of reflection light changes dynamically due to a varying distance to a subject, distance-measuring can be performed with high accuracy.

In addition, the distance-measuring system of the present disclosure may further include an image output selector. The image output selector may select and output at least one of the plurality of distance images and the composite distance image.

With such a distance-measuring system, a necessary distance image can be appropriately selected by application utilizing the distance-measuring system, thus unnecessary image processing can be omitted.

In order to solve the above-mentioned problem, a distance-measuring method according to an aspect of the present disclosure includes: causing a plurality of light sources including at least a first light source and a second light source to emit light at different angles relative to an optical axis, and controlling the plurality of light sources so that light is emitted to only a partial area in common; exposing to reflection light emitted by the plurality of light sources and reflected by a subject at times and for exposure periods that are set individually for each of the plurality of light sources, and generating distance images for the reflection light in emission areas to which light is emitted by the plurality of light sources, based on a quantity of electric charge of the reflection light, the distance images each indicating a distance to the subject; generating a reliability level of the distance image from the reflection light and the distance image corresponding to the reflection light; and exclusively selecting pixels to be composited from a plurality of distance images each of which is the distance image, generated for the plurality of light sources, for a range in which the emission areas of light are not overlapped, determining pixels to be composited based on the reliability level for a range in which the emission areas of light are overlapped, and generating a composite distance image.

Thus, the same effect as in the distance-measuring system is achieved.

It is to be noted that the present disclosure can be implemented as the distance-measuring system, and also the circuit and function can be replaced with a program of a computer and its operation steps.

As described above, according to the present disclosure, it is possible to perform distance-measuring in a wide range from a short distance to a long distance, and yet the power consumption of light sources can be maintained at a low level.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4A is a chart illustrating an example of a first distance image in Embodiment 1;

FIG. 4B is a chart illustrating an example of a second distance image in Embodiment 1;

FIG. 4C is a chart illustrating an example of reliability level information in Embodiment 1;

FIG. 4D is a chart illustrating an example of a composite distance image in Embodiment 1;

FIG. 5 is a diagram illustrating the configuration of a distance-measuring system according to Embodiment 2;

FIG. 7 is a diagram illustrating the configuration of a distance-measuring system according to Embodiment 3;

FIG. 9 is a diagram illustrating the configuration of a distance-measuring system according to Embodiment 4;

DETAILED DESCRIPTION OF THE EMBODIMENTS

Hereinafter, an embodiment of the present disclosure will be described with reference to the drawings. Each of the embodiments described below illustrates a preferable example of the present disclosure. Therefore, the numerical values, shapes, materials, components, arrangement positions and topologies of the components, steps, and order of the steps that are shown in the following embodiments are just examples, and are not intended to limit the scope of the present disclosure. Thus, those components in the following embodiments, which are not stated in the independent claim that defines the most generic concept are each described as an arbitrary component.

It should be noted that the respective figures are schematic diagrams and are not necessarily precise illustrations. Furthermore, in the respective figures, the same reference sign is given to substantially identical components, and overlapping description is omitted or simplified.

Embodiment 1

Hereinafter, Embodiment 1 will be described using FIGS. 1 to 4D.

[1-1. Configuration]

Figure 1:
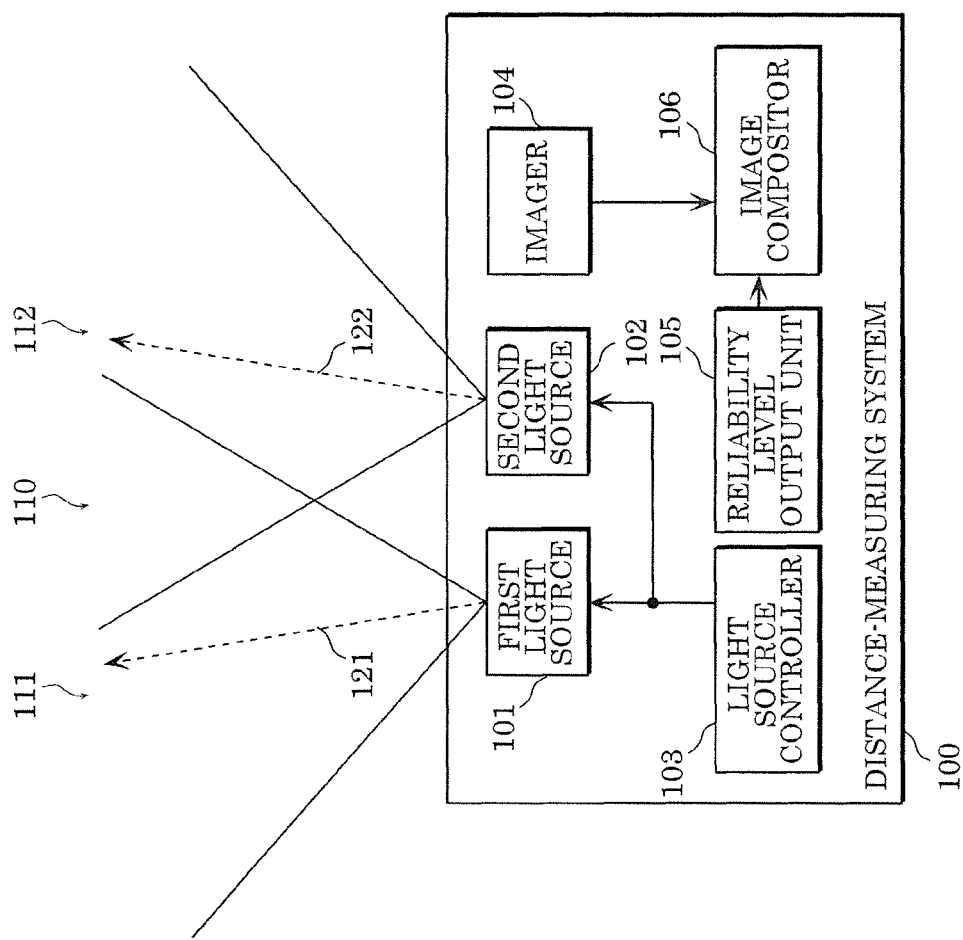
FIG. 1 is a diagram illustrating the configuration of a distance-measuring system according to Embodiment 1.

FIG. 1 is a diagram illustrating the configuration of distance-measuring system 100 according to the embodiment. 100 indicates a distance-measuring system, 101 indicates a first light source, 102 indicates a second light source, 103 indicates a light source controller, 104 indicates an imager, 105 indicates a reliability level output unit, and 106 indicates an image synthesizer. In addition, 121 indicates a first emission axis, 122 indicates a second emission axis, 111 indicates a first emission area, 112 indicates a second emission area, and 110 indicates a common emission area.

First light source 101 and second light source 102 emit light to the outside according to the timing indicated by a light-emission control signal inputted from light source controller 103. First light source 101 and second light source 102 are, for instance, an LD (Laser Diode) or an LED (Light Emitting Diode) that emits infrared light, however, are not limited to these. It is sufficient that first light source 101 and second light source 102 emit light detectable by imager 104.

Light source controller 103 controls, for instance, the timing and period of emission of light to first light source 101 and second light source 102. Specifically, light source controller 103 outputs a light-emission control signal to each of first light source 101 and second light source 102. The light-emission control signal is a binary digital signal having for instance "H" and "L", "H" may indicate light emission, and "L" may indicate light-emission stop. In addition, light source controller 103 outputs a light-emission control signal so that first light source 101 and second light source 102 alternately emit light, for instance. In other words, light source controller 103 performs control so that first light source 101 and second light source 102 do not emit light simultaneously, for instance. Also, light source controller 103 is implemented by a processor or a dedicated circuit that reads a program from a built-in memory, and executes the read program, for instance. It is to be noted that in addition to the timing and period of emission of light, light source controller 103 may control the intensity of emitted light.

Imager 104 exposes to reflection light at individual timing and with an exposure period, the reflection light being such that the light emitted from first light source 101 and second light source 102 is reflected by a subject (not illustrated). Imager 104 then generates a distance image (see FIGS. 4A and 4B) from the quantity of electric charge of reflection light to which exposure to made, the distance image indicating the distance to a subject in an emission area. In other words, imager 104 generates two types of distance images: one is a distance image when exposure to reflection light is made, in which light of first light source 101 is emitted and reflected by a subject, and the other is a distance image when exposure to reflection light is made, in which light of second light source 102 is emitted and reflected by a subject. Imager 104 includes, for instance, an optical lens, a TOF image sensor, and a signal processing circuit which are not illustrated.

The optical lens is a lens for focusing reflection light to an image sensor, the reflection light being emitted from first light source 101 and second light source 102 and reflected by a subject. The optical lens is, for instance, a convex lens.

The image sensor accumulates electric charge by exposing to reflection light for each pixel, and outputs the accumulated electric charge to the signal processing circuit. Accumulation of electric charge is started substantially at the same time when reflection light arrives. Also, the electric charge accumulatively increases during a period in which exposure to reflection light is made. The image sensor may be, for instance, a CMOS (Complementary Metal Oxide Semiconductor) sensor, or a CCD (Charge Coupled Device) sensor.

The signal processing circuit calculates distance information from the quantity of electric charge outputted from the image sensor, the timing at which the light source emits light, and the period during which light is emitted, the distance information indicating the distance to a subject for each pixel. Imager 104 outputs the calculated distance information as a distance image to image compositor 106, the distance image being a set of pieces of distance information in an emission area of the light sources. The signal processing circuit is implemented by a processor or a dedicated circuit that reads a program from a built-in memory, and executes the read program, for instance.

Also, the optical axis center of imager 104 is disposed so as to substantially match the central axis of the optical lens.

Reliability level output unit 105 outputs reliability level information (see FIG. 4C) to image compositor 106, the reliability level information indicating the reliability level of the distance image in common emission area 110. Reliability level output unit 105 pre-stores, for instance, reliability level information. A distance image (a first distance image) which is generated by reflection light emitted by first light source 101 and reflected by a subject and indicates the distance to a subject, and a distance image (a second distance image) which is generated by reflection light emitted by first light source 102 and reflected by a subject and indicates the distance to the subject are each a distance image measured at a common location in common emission area 110. In other words, the distance image in common emission area 110 includes two types: the first distance image and the second distance image (see FIGS. 4A and 4B). The reliability level information is used when the distance images in common emission area 110 of the first distance image and the second distance image are composited by image compositor 106. It is to be noted that reliability level output unit 105 does not need to pre-store reliability level information. For instance, reliability level output unit 105 may calculate reliability level information on distance image from the distance image most recently generated and the distance image currently generated in consideration of noise or the like. Alternatively, reliability level output unit 105 may calculate reliability level information based on the types of light sources, a signal level of reflection light, a time at which each distance image is generated, or a combination of those.

Image compositor 106 generates a composite distance image (see FIG. 4D) from the distance image outputted from imager 104 and the reliability level information outputted from reliability level output unit 105, the composite distance image indicating the distance to a subject in first emission area 111 and second emission area 112. Specifically, image compositor 106 generates a composite distance image by compositing the first distance image and the second distance image based on the reliability level information. Image compositor 106 is implemented by a processor or a dedicated circuit that reads a program from a built-in memory, and executes the read program, for instance. Image compositor 106 then outputs a result to an output unit (not illustrated) which is a device to output a result composited. The output unit is, for instance, a display such as an LCD (Liquid Crystal Display) that displays a distance image. It is to be noted that the output unit is not limited to a display. For instance, the output unit may output warning sound from a result composited by image compositor 106.

It is to be noted that light source controller 103, the signal processing circuit of imager 104, and image compositor 106 may include, for instance, a common processor or dedicated circuit.

[1-2. Operation]

Next, the operation of distance-measuring system 100 according to the embodiment will be described using FIGS. 2 to 4D.

Figure 2:
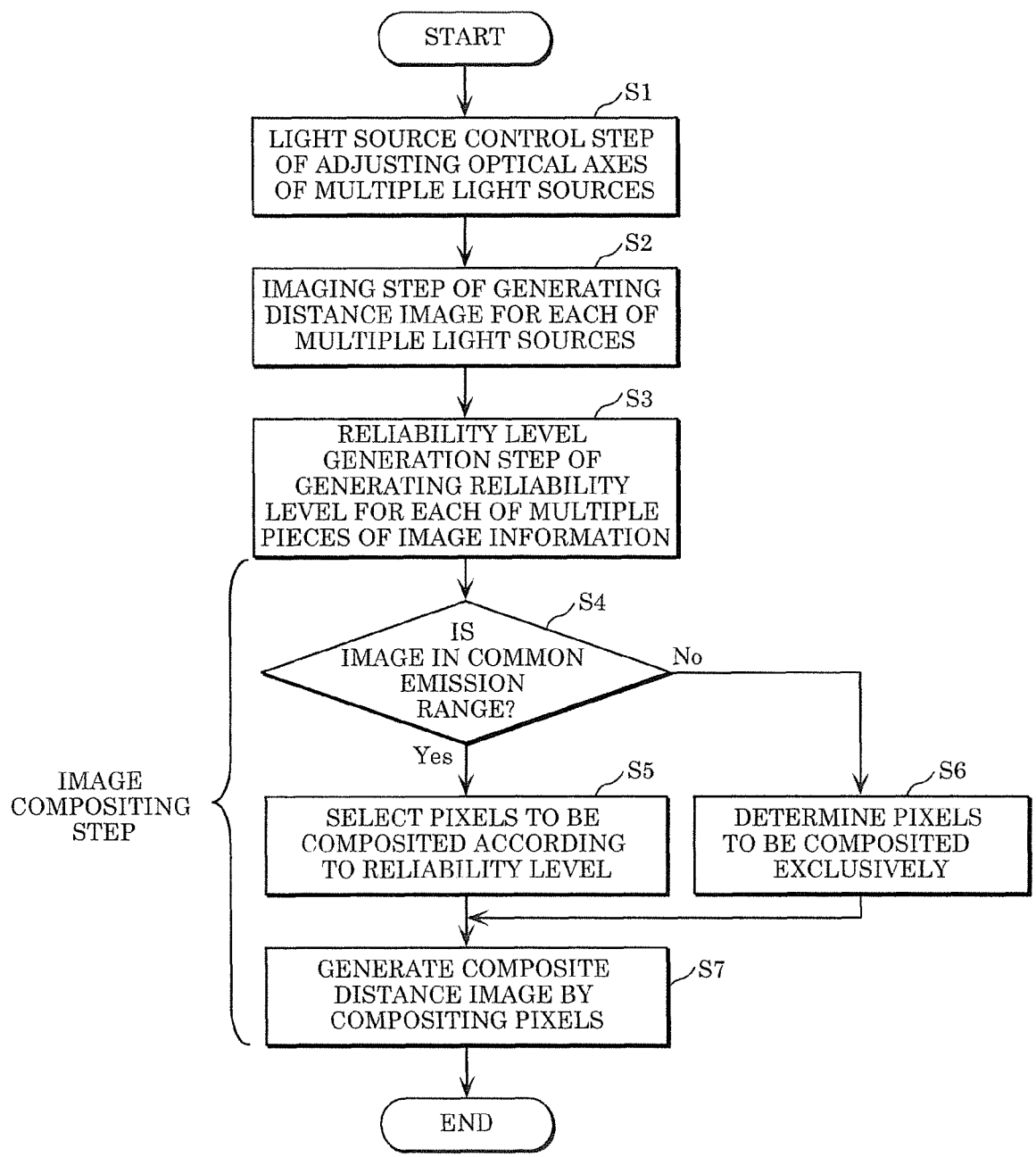
FIG. 2 is a flowchart illustrating the operation of the distance-measuring system according to Embodiment 1.

FIG. 2 is a flowchart illustrating the operation of distance-measuring system 100 according to Embodiment 1.

First, first light source 101 and second light source 102 are installed so that respective optical axes are inclined from the optical axis of imager 104 at different angles (S1). First light source 101 emits light along first emission axis 121, and the emitted light is diffused to first emission area 111. Second light source 102 emits light along second emission axis 122, and the emitted light is diffused to second emission area 112. First emission area 111 and second emission area 112 has an overlapped emission area in the range of common emission area 110.

Next, light source controller 103 initially drives first light source 101 to emit light. Imager 104 exposes to reflection light emitted by first light source 101 and reflected by a subject, and generates the first distance image from a result of the exposure (S2). Imager 104 then outputs the generated first distance image to image compositor 106. Subsequently, light source controller 103 stops driving of first light source 101, then drives second light source 102 to emit light. Imager 104 exposes to reflection light emitted by second light source 102 and reflected by a subject, and generates the second distance image from a result of the exposure (S2). Imager 104 then outputs the generated second distance image to image compositor 106.

Reliability output unit 105 outputs reliability information to image compositor 106, the reliability level information indicating the reliability level of each distance image in common emission area 110 (S3).

Image compositor 106 generates a composite distance image from two received distance images and reliability levels as described later (S4 to S7). Steps S4 to S7 will be described later.

Figure 3:
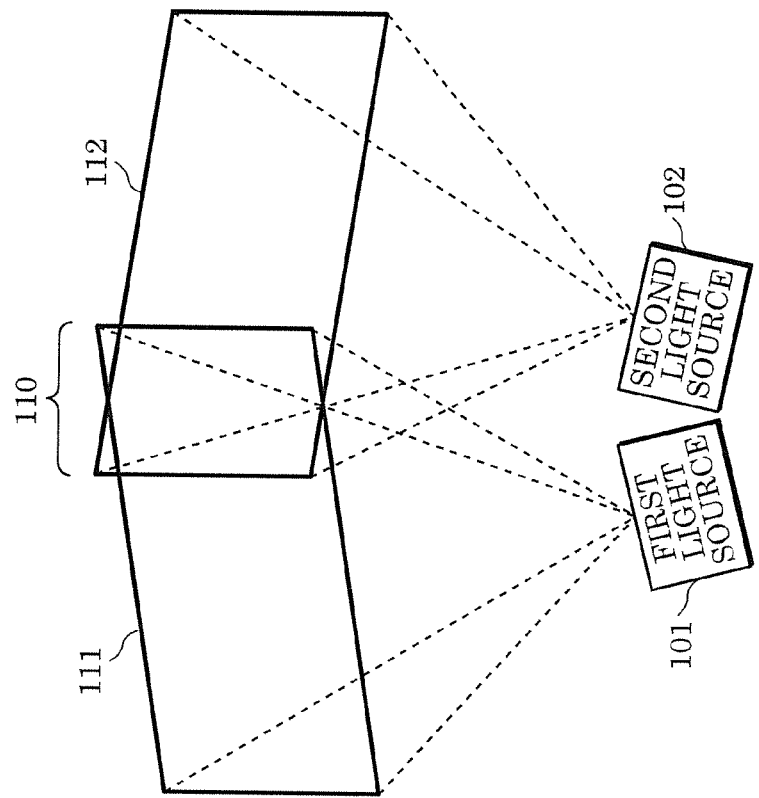
FIG. 3 is a view illustrating the relationship between emission areas.

FIG. 3 is a view illustrating the relationship between first emission area 111, second emission area 112, and common emission area 110. In FIG. 3, first light source 101 and second light source 102 have a rectangular emission area. However, without being limited to this, first light source 101 and second light source 102 may have a circular emission area, for instance. Certain common emission area 110 can be created by inclining the optical axes of first light source 101 and second light source 102 from the optical axis of imager 104 as in FIG. 3.

FIGS. 4A to 4D are each a chart illustrating an example of composition of distance images in the embodiment. 301 indicates the first distance image, 302 indicates the second distance image, 303 indicates reliability level information, and 304 indicates a composite distance image. In general, the size of a distance image is often greater than or equal to QVGA (Quarter Video Graphics Array: 320 pixels horizontally, 240 pixels vertically). However, for the sake of simplicity of description, the size of each distance image is assumed to be 6 pixels horizontally and 4 pixels vertically below. Also, FIG. 4C, in which common emission area 110 is set to the range of horizontal 2 pixels and vertical 4 pixels at the center of the distance image, illustrates the cells corresponding to common emission area 110 only.

FIG. 4A is a chart illustrating an example of first distance image 301 in the embodiment. First distance image 301 of FIG. 4A is a distance image generated by reflection light emitted by first light source 101 and reflected by a subject. The numeral in each cell indicates distance information (the distance to a subject, corresponding to the pixel), and distance information is generated in first emission area 111. However, distance information is not generated outside first emission area 111 because light is not emitted to the outside.

FIG. 4B is a chart illustrating an example of second distance image 302 in the embodiment. Second distance image 302 of FIG. 4B is a distance image generated by reflection light emitted by second light source 102 and reflected by a subject. Distance information is generated in second emission area 112, however distance information is not generated outside second emission area 112 because light is not emitted to the outside.

FIG. 4C is a chart illustrating an example of reliability level information 303 in the embodiment. Reliability level information 303 of FIG. 4C indicates a reliability level for each pixel (each piece of distance information) of the distance image in common emission area 110. In each cell, numeral 1 indicates first light source 101, and numeral 2 indicates second light source 102. The numeral on the left side in each cell indicates a higher reliability level (priority). In the example of FIG. 4C, for instance, the pixels (the column on the left side of FIG. 4C) near first light source 101 has a higher reliability level of first light source 101, and the pixels (the column on the right side of FIG. 4C) near second light source 102 has a higher reliability level of second light source 102.

FIG. 4D is a chart illustrating an example of composite distance image 304 in the embodiment. Composite distance image 304 of FIG. 4D illustrates a composite distance image of first distance image 301 and second distance image 302. Here, FIG. 2 is referred to again. In the range other than common emission area 110 (No in S4), image compositor 106 exclusively selects distance information from first distance image 301 and second distance image 302 (S6). In the range of common emission area 110, image compositor 106 selects distance information based on reliability level information 303 (S5). For instance, image compositor 106 compares reliability levels for each pixel of the distance image, and selects distance information in the pixel, having a higher reliability level.

Image compositor 106 generates composite distance image 304 by compositing the pieces of distance information selected in step S5 and step S6, the composite distance image being distance information in an emission area to which light is emitted by the light sources (S7).

It is to be noted that although distance information is selected from a distance image having a higher reliability level (highest priority) in FIG. 4D, a method of determining distance information is not limited to this. For instance, a weighted average of range information may be taken without exclusively selecting distance information from each distance image. Also, in common emission area 110, distance information can be obtained for each frame, thus distance information may be estimated by a Kalman filter, and composite distance image 304 may be generated using the estimated distance information.

[1-3. Effect]

As described above, distance-measuring system 100 according to the embodiment includes: a plurality of light sources including at least a first light source 101 and a second light source 102 that emit light; a light source controller 103 that controls timing and an emission period at which and during which the plurality of light sources emit light; an imager 104 that exposes to reflection light emitted by the plurality of light sources and reflected by a subject at times and for exposure periods that are set individually for each of the plurality of light sources, and generates a plurality of distance images for the reflection light in emission areas to which light is emitted by the plurality of light sources, based on a quantity of electric charge of the reflection light, the distance images each indicating a distance to the subject; a reliability level output unit 105 that outputs a reliability level for the distance for each of the plurality of distance images; and an image compositor 106 that composites the plurality of distance images generated for the reflection light. The plurality of light sources emit light at different angles relative to an optical axis of the imager 104, the emission areas of the plurality of light sources partially overlap in a common emission area 110, and the image compositor 106 exclusively selects pixels to be composited from the plurality of distance images for an outside of the common emission area 110, determines pixels to be composited based on the reliability level for the common emission area 110, and generates a composite distance image 304.

Also, a distance-measuring method according to the embodiment includes: controlling (S1) a plurality of light sources including at least a first light source 101 and a second light source 102 so that light is emitted to only a partial area in common by causing the plurality of light sources to emit at different angles relative to an optical axis; exposing to reflection light emitted by the plurality of light sources and reflected by a subject at times and for exposure periods that are set individually for each of the plurality of light sources, and generating (S2) distance images for the reflection light in emission areas to which light is emitted by the plurality of light sources, based on a quantity of electric charge of the reflection light, the distance images each indicating a distance to the subject; generating (S3) a reliability level of the distance image from the reflection light and the distance image corresponding to the reflection light; and exclusively selecting (S6) pixels to be composited from a plurality of distance images each of which is the distance image, generated for the plurality of light sources, for a range in which the emission areas of light are not overlapped (No in S4), determining pixels (S5) to be composited based on the reliability level for a range in which the emission areas of light are overlapped (Yes in S4), and generating (S7) a composite distance image (S4 to S7).

Thus, distance-measuring with a wide viewing angle is made possible for short distance. Also, in common emission area 110, distance information can be obtained for every frames, thus it is possible to enhance a noise reduction effect on the distance information by weighted average and a time series filter such as a Kalman filter. Therefore, the distance-measuring accuracy for a long distance can be increased by placing a long distance area with high noise components in common emission area 110. Furthermore, light is not emitted simultaneously from all light sources for every frames, but light is emitted from only part of the light sources, thus the power consumption can be maintained at a low level.

Embodiment 2

Hereinafter, Embodiment 2 will be described using FIGS. 5 to 6D. In the embodiment, a distance-measuring system is assumed to have different distance-measuring ranges for every light sources. For instance, the distance-measuring system includes a light source for the purpose of distance-measuring from a short distance to a middle distance, and a light source for the purpose of distance-measuring from a middle distance to a long distance.

It is to be noted that in the embodiment, only different points from Embodiment 1 will be described, and the same component as in Embodiment 1 is labeled with the same symbol, and a description is omitted.

[2-1. Configuration and Operation]

FIG. 5 is a diagram illustrating the configuration of distance-measuring system 100a according to the embodiment. 100a indicates a distance-measuring system, 105a indicates a reliability level output unit, and 401 indicates a light source priority table. The embodiment differs from Embodiment 1 illustrated in FIG. 1 in that reliability level output unit 105a has light source priority table 401. Hereinafter light source priority table 401 of reliability level output unit 105a will be mainly described.

As illustrated in FIG. 5, reliability level output unit 105a has light source priority table 401. As illustrated in FIG. 6C, light source priority table 401 is an information table that defines the distance image of a light source to be assigned a higher priority for each distance range. In FIG. 6C, first light source 101 is a light source for the purpose of distance-measuring from a short distance to a middle distance, and has a higher priority in the distance range 0 to 90 (the first priority is 1 which indicates first light source 101). Also, second light source 102 is a light source for the purpose of distance-measuring from a middle distance to a long distance, and has a higher priority in the distance range 91 or greater (the first priority is 2 which indicates second light source 102). In other words, the information table is generated so that the priority of more suitable light source is higher in consideration of the measurement range for each light source. Reliability level output unit 105a may pre-store light source priority table 401, or light source priority table 401 may be set each time by a user. Hereinafter, description is given under the assumption that reliability level output unit 105a pre-stores light source priority table 401.

Next, the operation of distance-measuring system 100a according to the embodiment will be described. The operation until first distance image 301 (FIG. 6A) and second distance image 302 (FIG. 6B) are generated by imager 104 is the same as in Embodiment 1, and a description is omitted.

As illustrated in FIG. 5, imager 104 also outputs the generated distance image to reliability level output unit 105a in addition to image compositor 106. Reliability level output unit 105a selects a reliability level based on the distance information on each distance image and light source priority information for each distance range recorded in light source priority table 401, and outputs the reliability level to image compositor 106. Other operations are the same as in Embodiment 1.

FIGS. 6A to 6D are charts for explaining composition of distance images in the configuration of FIG. 5. 401 indicates a light source priority table, and 304a indicates a composite distance image.

Figure 6A:
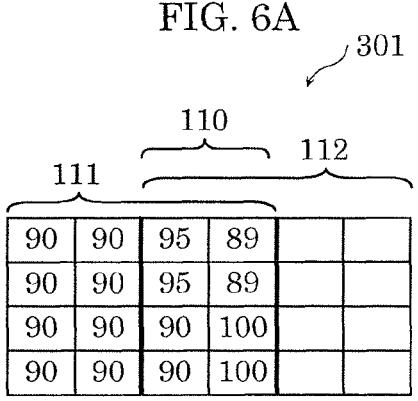
FIG. 6A is a chart illustrating an example of a first distance image in Embodiment 2.
Figure 6B:
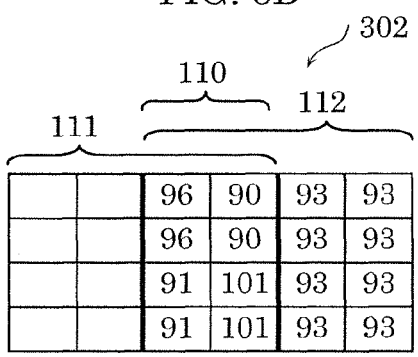
FIG. 6B is a chart illustrating an example of a second distance image in Embodiment 2.
Figure 6C:
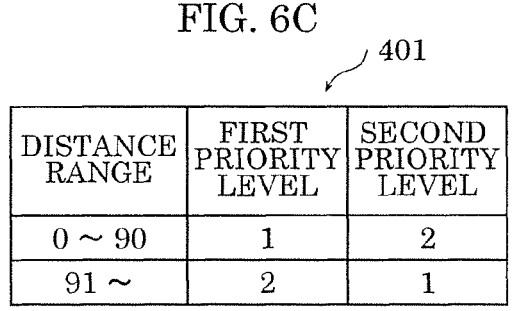
FIG. 6C is a table illustrating an example of a light source priority table in Embodiment 2.

FIGS. 6A and 6B are charts illustrating respective examples of first distance image 301 and second distance image 302 in the embodiment. FIGS. 6A and 6B are assumed to have the same contents as in FIGS. 4A and 4B, respectively.

FIG. 6C is a table illustrating an example of light source priority table 401 in the embodiment. Light source priority table 401 is an information table that defines the distance image of a light source to be assigned a higher priority for each distance range. In light source priority table 401 illustrated in FIG. 6C, when the distance range is 0 or greater and 90 or less, first light source 101, and second light source 102 are in descending order of priority, and when the distance range is greater than or equal to 91, second light source 102, and first light source 101 are in descending order of priority.

It is to be noted that setting of the distance range and priority is not limited to this. For instance, the distance range may be set according to light source conditions. Also, for instance, light source priority table 401 may be an information table of the first priority (the highest priority) only.

Figure 6D:
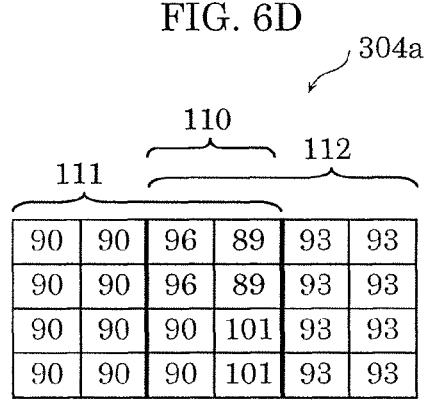
FIG. 6D is a chart illustrating an example of a composite distance image in Embodiment 2.

FIG. 6D is a chart illustrating an example of composite distance image 304a in the embodiment. Composite distance image 304a of FIG. 6D illustrates a composite distance image of first distance image 301 and second distance image 302. In the range other than common emission area 110, image compositor 106 exclusively selects distance information from first distance image 301 and second distance image 302. In the range of common emission area 110, image compositor 106 selects distance information based on light source priority table 401.

Here, as the distance information to be compared with the distance range of light source priority table 401, for instance, the value of first distance image 301 is used for a pixel near first light source 101, the value of second distance image 302 is used for a pixel near second light source 102, or an average value of both values may be used. FIG. 6D illustrates the result of a composite of distance images using the average value of the distance images.

[2-2. Effect]

As described above, in distance-measuring system 100a according to the embodiment, reliability level output unit 105a includes light source priority table 401 that defines the priorities of the light sources for each distance range. Reliability level output unit 105a compares distance information indicating the distance for each pixel of the distance image with the values of light source priority table 401, and selects and outputs a reliability level.

The distance range in which distance-measuring is possible can be changed by the intensity of the light sources and the characteristics of the optical waveform. Therefore, with the distance-measuring system as described above, even when a distance range in which measurement is possible and a distance range having a high distance-measuring accuracy are varied with light sources, an optimal distance information can be selected in each distance range, thus the distance-measuring accuracy can be increased.

Embodiment 3

Hereinafter, Embodiment 3 will be described using FIGS. 7 to 8D. In the embodiment, a distance-measuring system is assumed to have different light emission intensities of the light sources for every light sources. For instance, the distance-measuring system includes a weak light source for the purpose of distance-measuring from a short distance to a middle distance, and a strong light source for the purpose of distance-measuring from a middle distance to a long distance.

It is to be noted that in the embodiment, only different points from Embodiment 1 will be described, and the same component as in Embodiment 1 is labeled with the same symbol, and a description is omitted.

[3-1. Configuration and Operation]

FIG. 7 is a diagram illustrating the configuration of the distance-measuring system in the embodiment. 100b indicates a distance-measuring system, 105b indicates a reliability level output unit, and 501 indicates a signal level checker. The embodiment differs from Embodiment 1 illustrated in FIG. 1 in that reliability level output unit 105b includes signal level checker 501.

As illustrated in FIG. 7, reliability level output unit 105b includes signal level checker 501. Signal level checker 501 checks the signal level of reflection light in common emission area 110 of each distance image received from imager 104. The signal level is a numerical value which indicates the intensity of reflection light, for instance. Signal level checker 501 checks the signal level for each pixel in common emission area 110. Reliability level output unit 105b calculates a reliability level based on a result of checking by signal level checker 501, and outputs the result to image compositor 106. For instance, reliability level output unit 105b calculates the reliability level of a pixel having a high signal level as a high level. Other operations are the same as in Embodiment 1.

FIGS. 8A to 8D are charts for explaining composition of distance images in the configuration of FIG. 7. 501a indicates the signal level of the first distance image, 501b indicates the signal level of the second distance image, and 304b indicates a composite distance image.

Figures 8A, 8B, 8C, 8D:
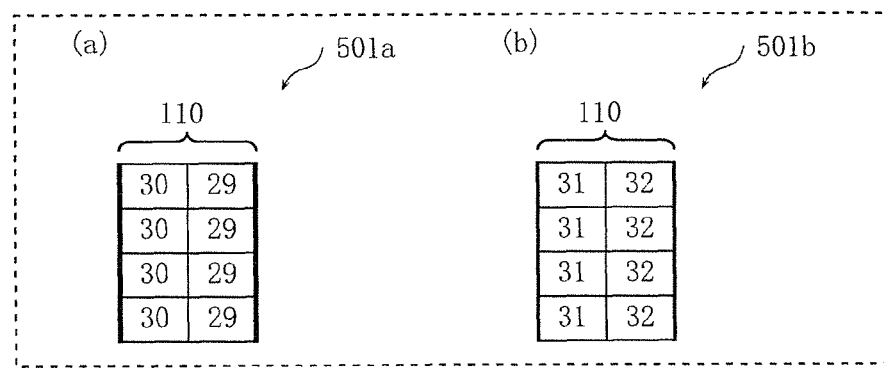
FIG. 8A is a chart illustrating an example of a first distance image in Embodiment 3.
FIG. 8B is a chart illustrating an example of a second distance image in Embodiment 3.
FIG. 8C is a chart illustrating an example of a signal level of each distance image in Embodiment 3.
FIG. 8D is a chart illustrating an example of a composite distance image in Embodiment 3.

FIGS. 8A and 8B are charts illustrating respective examples of first distance image 301 and second distance image 302 in the embodiment. FIGS. 8A and 8B are assumed to have the same contents as in FIGS. 4A and 4B, respectively.

FIG. 8C is a chart illustrating an example of a signal level of each distance image. Signal level 501a of first distance image of FIG. 8C indicates the signal level of reflection light reflected by a subject in common emission area 110 of first distance image 301. Signal level 501b of second distance image indicates the signal level of reflection light reflected by a subject in common emission area 110 of second distance image 302. Reliability level output unit 105b sets a reliability level from the signal level of each distance image, and outputs the set reliability level to image compositor 106.

FIG. 8D is a chart illustrating composite distance image 304b obtained by compositing first distance image 301 and second distance image 302. In the range other than common emission area 110, image compositor 106 exclusively selects distance information from first distance image 301 and second distance image 302. In the range of common emission area 110, image compositor 106 selects distance information based on the signal level of reflection light of each distance image. In the example of FIG. 8C, when signal level 501a of the first distance image is compared with signal level 501b of the second distance image, signal level 501b of the second distance image is higher in all pixels. Therefore, image compositor 106 uses the value (distance information) selected from second distance image 302 for all pixels in common emission area 110, and generates composite distance image 304b. Also, a weighted average may be taken without exclusively selecting distance information as described above.

[3-2. Effect]

As described above, in distance-measuring system 100b according to the embodiment, reliability level output unit 105b includes signal level checker 501 that checks the signal level of reflection light. Signal level checker 501 checks the signal level of reflection light corresponding to a distance image, and generates and outputs a higher reliability level for a greater signal level.

With such a distance-measuring system in which the light sources have different light emission intensities, distance information using reflection light having a higher signal level can be used, thus the distance-measuring accuracy can be increased. Also, the manner in which a subject is exposed to light is varied depending on the shape and position of the subject, thus even when the light sources have the same light emission intensity, the embodiment is effective.

Embodiment 4

Hereinafter, Embodiment 4 will be described using FIGS. 9 to 10D. In Embodiment 4, it is assumed to range a quickly moving subject.

It is to be noted that in the embodiment, only different points from Embodiment 1 will be described, and the same component as in Embodiment 1 is labeled with the same symbol, and a description is omitted.

[4-1. Configuration and Operation]

FIG. 9 is a diagram illustrating the configuration of a distance-measuring system according to the embodiment. 100c indicates a distance-measuring system, 105c indicates a reliability level output unit, and 601 indicates an imaging time checker. The embodiment differs from Embodiment 1 illustrated in FIG. 1 in that reliability level output unit 105c includes imaging time checker 601.

As illustrated in FIG. 9, reliability level output unit 105c includes imaging time checker 601. As illustrated in FIG. 9, imager 104 also outputs the generated distance image to reliability level output unit 105c in addition to image compositor 106. Imaging time checker 601 checks the imaging time of each distance image. For instance, imaging time checker 601 assumes the time when each distance image is generated by imager 104 as the imaging time, or the time when each distance image is received from imager 104 as the imaging time. Reliability level output unit 105c calculates a reliability level based on a result of checking by imaging time checker 601, and outputs the result to image compositor 106. Other operations are the same as in Embodiment 1.

FIGS. 10A to 10D are charts for explaining composition of distance images in the configuration of FIG. 9. 601a indicates an imaging time, and 304c indicates a composite distance image.

Figure 10A:
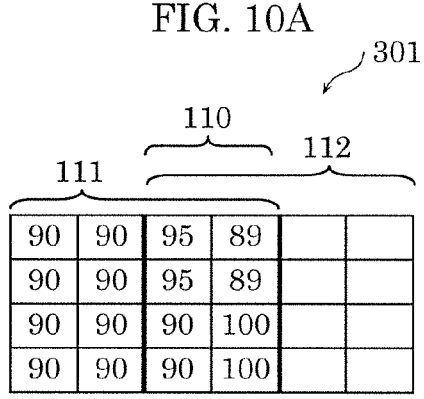
FIG. 10A is a chart illustrating an example of a first distance image in Embodiment 4.
Figure 10B:
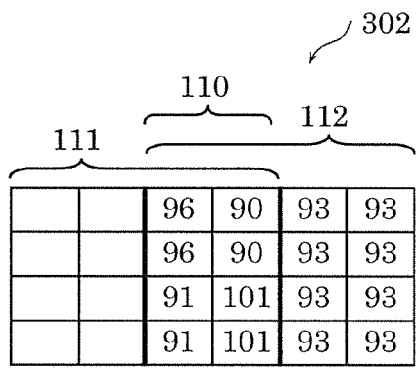
FIG. 10B is a chart illustrating an example of a second distance image in Embodiment 4.

FIGS. 10A and 10B are charts illustrating respective examples of first distance image 301 and second distance image 302 in the embodiment. FIGS. 10A and 10B are assumed to have the same contents as in FIGS. 4A and 4B, respectively.

Figure 10C:
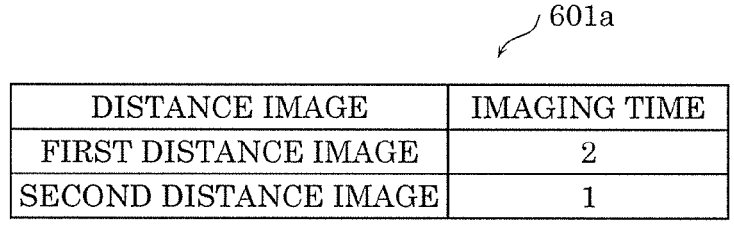
FIG. 10C is a table illustrating an example of an imaging time in Embodiment 4.

FIG. 10C is a table illustrating an example of imaging time 601a in the embodiment. Imaging time 601a of FIG. 10C is a table illustrating the imaging times of first distance image 301 and second distance image 302. For instance, a larger numerical value indicates more recent imaging. In FIG. 10C, the imaging time of first distance image 301 is 2, and the imaging time of second distance image 302 is 1. Thus, in the example of FIG. 10C, first distance image 301 indicates a more recent image. Reliability level output unit 105c sets a higher reliability level of first distance image 301 based on imaging time 601a, and outputs the set reliability level to image compositor 106.

Figure 10D:
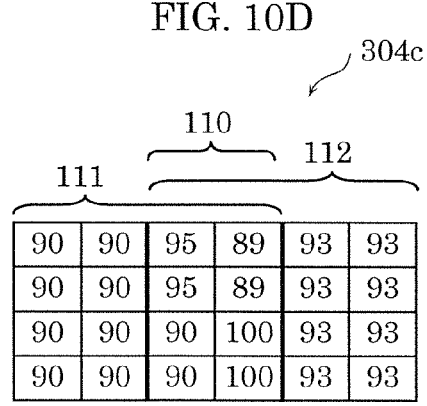
FIG. 10D is a chart illustrating an example of a composite distance image in Embodiment 4.

FIG. 10D is a chart illustrating an example of composite distance image 304c obtained by compositing first distance image 301 and second distance image 302. In the range other than common emission area 110, image compositor 106 exclusively selects distance information from first distance image 301 and second distance image 302. In the range of common emission area 110, image compositor 106 selects distance information based on the imaging time of each distance image. When the imaging time of first distance image 301 is compared with the imaging time of second distance image 302, it can be seen that imaging of first distance image 301 corresponds to more recent distance image. Therefore, image compositor 106 uses the value (distance information) selected from first distance image 301 for all pixels in common emission area 110, and generates composite distance image 304c.

[4-2. Effect]

As described above, in distance-measuring system 100c according to the embodiment, reliability level output unit 105c includes imaging time checker 601 that checks the time of generation of a distance image. Imaging time checker 601 checks the time of generation of a distance image, and generates and outputs a higher reliability level for a newer time of generation.

With such a distance-measuring system, newer distance information can be used, thus even when a subject moves, distance-measuring can be performed with high accuracy.

Embodiment 5

Hereinafter, Embodiment 5 will be described using FIGS. 11 to 12D. In Embodiment 5, a distance-measuring system is assumed to drive some light sources simultaneously.

It is to be noted that in the embodiment, only different points from Embodiment 3 will be described, and the same component as in Embodiment 3 is labeled with the same symbol, and a description is omitted.

[5-1. Configuration and Operation]

Figure 11:
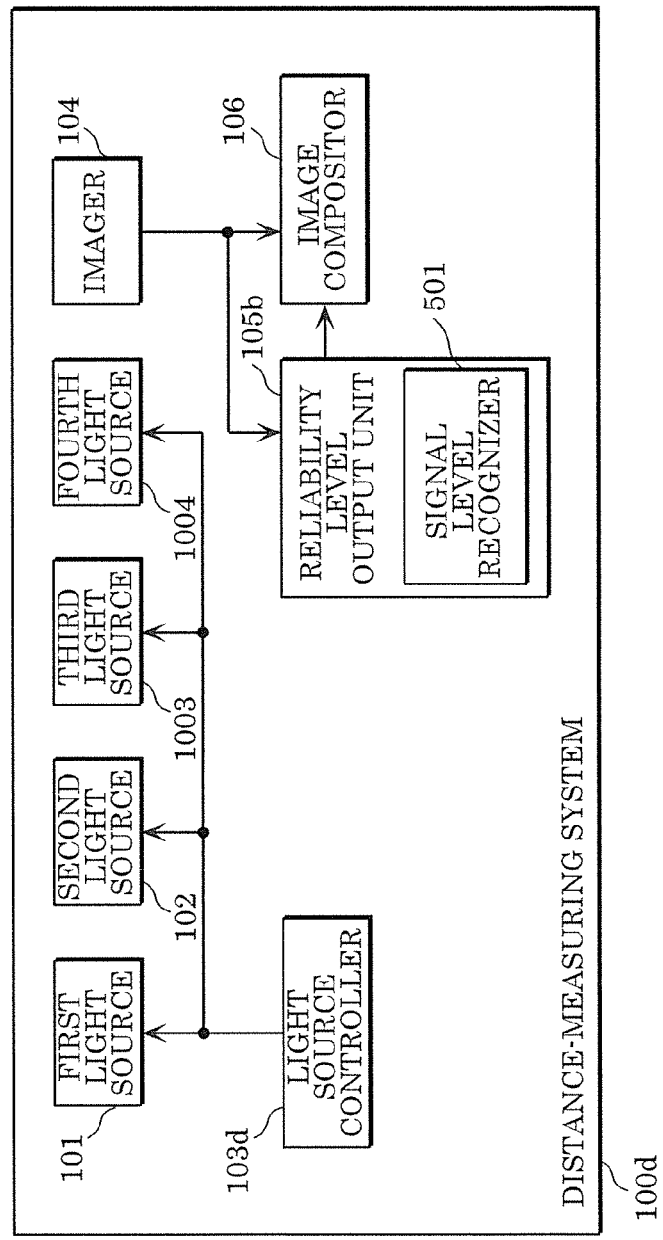
FIG. 11 is a diagram illustrating the configuration of a distance-measuring system according to Embodiment 5.

FIG. 11 is a diagram illustrating the configuration of the distance-measuring system in the embodiment. 100d indicates a distance-measuring system, 103d indicates a light source controller, 1003 indicates a third light source, and 1004 indicates a fourth light source. The embodiment differs from Embodiment 3 illustrated in FIG. 7 in that light source controller 103d controls third light source 1003 and fourth light source 1004 in addition to first light source 101 and second light source 102.

Figure 12A:
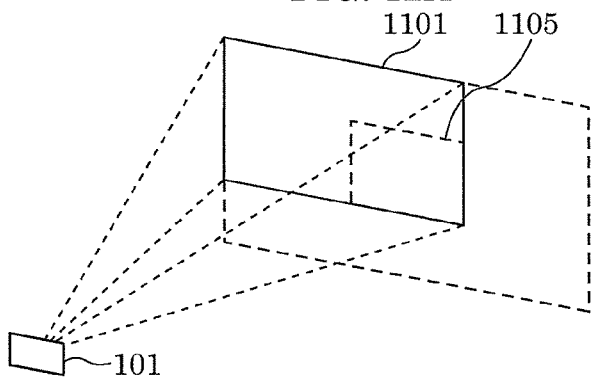
FIG. 12A is a view illustrating an example of an emission area of a first light source in Embodiment 5.
Figure 12B:
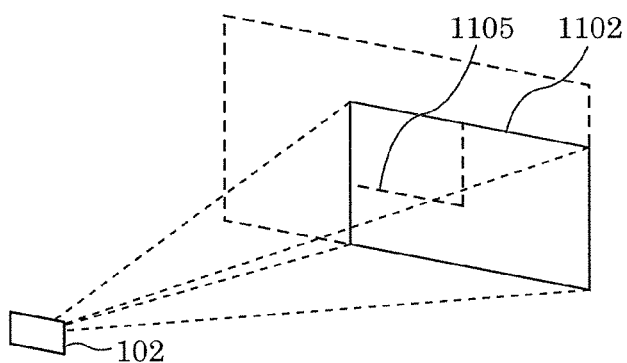
FIG. 12B is a view illustrating an example of an emission area of a second light source in Embodiment 5.
Figure 12C:
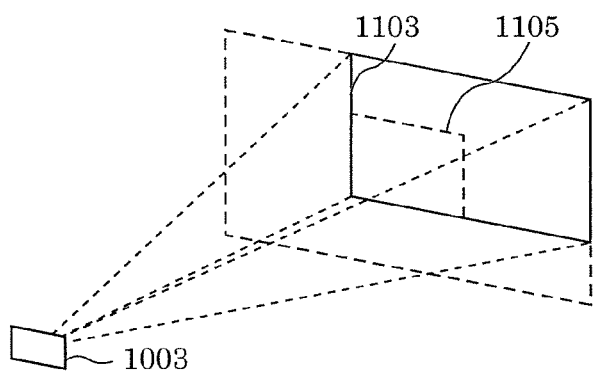
FIG. 12C is a view illustrating an example of an emission area of a third light source in Embodiment 5.
Figure 12D:
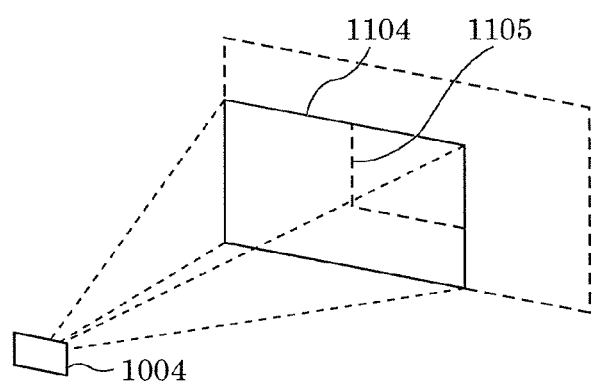
FIG. 12D is a view illustrating an example of an emission area of a fourth light source in Embodiment 5.

FIGS. 12A to 12D are views illustrating the emission areas of the light sources. FIG. 12A is a view illustrating the emission area of first light source 101. 1101 indicates a first emission area indicating the emission area of first light source 101. FIG. 12B is a view illustrating the emission area of second light source 102. 1102 indicates a second emission area indicating the emission area of second light source 102. FIG. 12C is a view illustrating the emission area of third light source 1003. 1103 indicates a third emission area indicating the emission area of third light source 1003. FIG. 12D is a view illustrating the emission area of fourth light source 1004. 1104 indicates a fourth emission area indicating the emission area of fourth light source 1004. 1105 indicates a common emission area indicating an emission area in common between the light sources. First emission area 1101 is obtained by inclining the emission axis of first light source 101 to the upper left from the optical axis of imager 104. Here, the optical axis of imager 104 is in the direction from the light source to the central portion of common emission area 1105. Second emission area 1102 is obtained by inclining the emission axis of second light source 102 to the lower right from the optical axis of imager 104. Third emission area 1103 is obtained by inclining the emission axis of third light source 1003 to the upper right from the optical axis of imager 104. Fourth emission area 1104 is obtained by inclining the emission axis of fourth light source 1004 to the lower left from the optical axis of imager 104.

Light source controller 103d initially drives first light source 101 and second light source 102 simultaneously to emit light. Imager 104 exposes to reflection light emitted by first light source 101 and second light source 102 and reflected by a subject, and generates a distance image. Imager 104 then outputs the generated distance image to image compositor 106.

Light source controller 103d stops driving of first light source 101 and the second light source, then drives third light source 1003 and fourth light source 1004 simultaneously to emit light. Imager 104 exposes to reflection light emitted by third light source 1003 and fourth light source 1004 and reflected by a subject, and generates a distance image. Imager 104 then outputs the generated distance image to image compositor 106. Other operations are the same as in Embodiment 3.

[5-2. Effect]

As described above, in distance-measuring system 100d according to the embodiment, light source controller 103d drives at least part of multiple light sources simultaneously.

With such a distance-measuring system, the intensity of light within common emission area 1105 can be increased by driving the light sources simultaneously, as compared with when the light sources are driven one by one in sequence, thus the distance-measuring range within common emission area 1105 can be extended. In short, the distance-measuring accuracy for a long distance can be increased. In addition, it is possible to increase the range in which distance-measuring can be performed at each imaging timing.

Although an example has been given, in which out of four light sources, two light sources are driven at a time simultaneously, the number of light sources and the number of light sources driven simultaneously are not limited to these. The number of light sources may be five or greater, and the number of light sources driven simultaneously may be three or greater. Alternatively, all light sources may be driven simultaneously. For instance, the light sources driven simultaneously are not limited to the combination mentioned above. For instance, first light source 101 and fourth light source 1004 may be driven simultaneously, or other combinations may be used.

Embodiment 6

Hereinafter, Embodiment 6 will be described using FIG. 13. Embodiment 6 is such that a function of limiting the number of light sources driven simultaneously is added to Embodiment 5. In the embodiment, for instance, when a subject is at a short distance, the light sources are driven in sequence so that pixels are not saturated, and when a subject is at a long distance, the light sources are driven simultaneously so that distance-measuring can be performed with high accuracy.

It is to be noted that in the embodiment, only different points from Embodiment 5 will be described, and the same component as in Embodiment 5 is labeled with the same symbol, and a description is omitted.

[6-1. Configuration and Operation]

Figure 13:
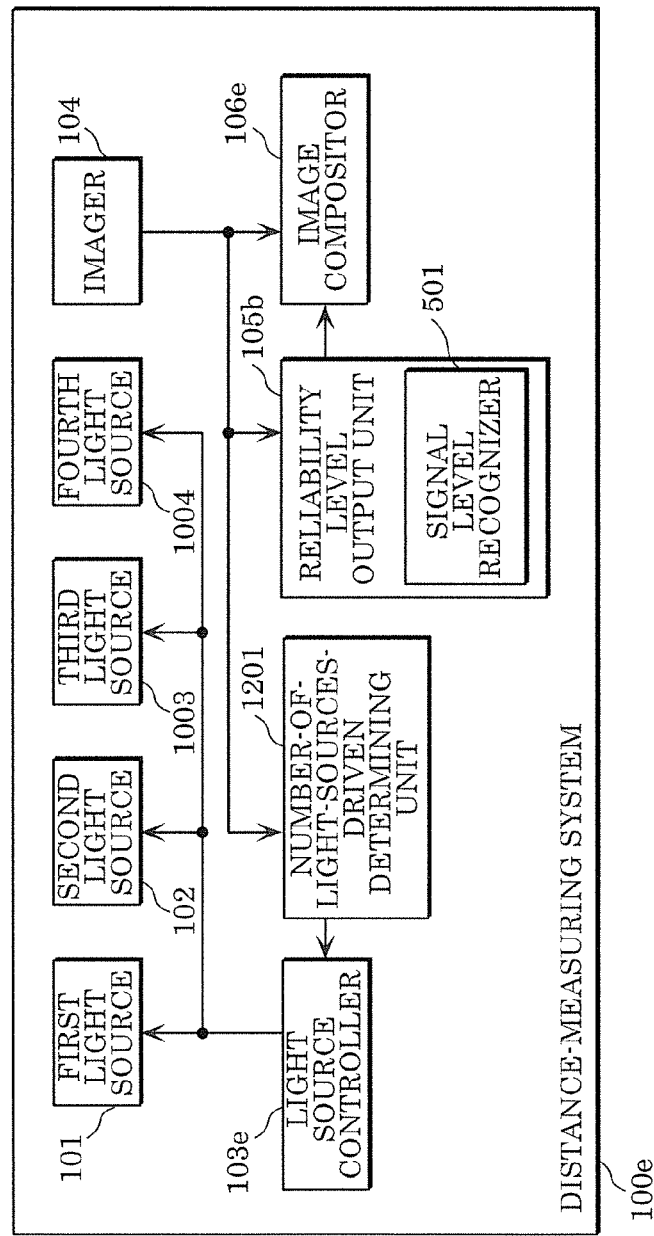
FIG. 13 is a diagram illustrating the configuration of a distance-measuring system according to Embodiment 6.

FIG. 13 is a diagram illustrating the configuration of the distance-measuring system in the embodiment. 100e indicates a distance-measuring system, 103e indicates a light source controller, 106e indicates an image compositor, and 1201 indicates a number-of-light-sources-driven determining unit. The embodiment differs from Embodiment 5 illustrated in FIG. 11 in that distance-measuring system 100e includes number-of-light-sources-driven determining unit 1201 which controls light source controller 103e.

Number of light sources driven determining unit 1201 checks the signal level of reflection light reflected by a subject, and determines the number of light sources which can be driven simultaneously. For instance, when the number of light sources driven simultaneously is two and the pixels are saturated, number-of-light-sources-driven determining unit 1201 determines that the number of light sources which can be driven is one, and notifies light source controller 103*e* and image compositor 106*e* of the information. However, when the number of light sources is one and the signal level is reduced, and it is determined that driving two light sources simultaneously causes no problem, number-of-light-sources-driven determining unit 1201 determines that the number of light sources is two, and notifies light source controller 103*e* and image compositor 106*e* of the information. It is to be noted that the signal level of reflection light is received from reliability level output unit 105*b*.

When receiving the information from number-of-light-sources-driven determining unit 1201, light source controller 103*e* changes the method of driving the light sources in accordance with the information. When the number of light sources driven is one, light source controller 103*e* drives all the light sources in sequence, for instance. Also, when the number of light sources driven is two, light source controller 103*e* drives, for instance, first light source 101 and second light source 102 simultaneously or drives third light source 1003 and fourth light source 1004 simultaneously.

When receiving the information from number-of-light-sources-driven determining unit 1201, image compositor 106*e* changes the number of images to be composited in accordance with the information. When the number of light sources driven is one, image compositor 106*e* composites, for instance, four distance images generated by reflection light emitted by the light source and reflected by a subject. When the number of light sources driven is two, image compositor 106*e* composites, for instance, two distance images generated by reflection light for first light source 101 and second light source 102, as well as third light source 1003 and fourth light source 1004. Other operations are the same as in Embodiment 5.

[6-2. Effect]

As described above, distance-measuring system 100*e* according to the embodiment further includes number-of-light-sources-driven determining unit 1201. Number of light sources driven determining unit 1201 determines the number of light sources driven simultaneously based on the magnitude of the signal level of reflection light, and notifies light source controller 103*e* of the number. Light source controller 103*e* controls driving of the multiple light sources based on the notified number of light sources.

In a distance-measuring system that emits light to measure a distance, in general, when reflection light to which exposure is made is saturated, distance information cannot be calculated from the quantity of electric charge of the light. Also, when the signal level of the reflection light is low, the distance-measuring accuracy is reduced. Therefore, with the distance-measuring system as described above, even when the signal level of reflection light changes dynamically due to a varying distance to a subject, distance-measuring can be performed with high accuracy. As described above, an optimal number of light sources can be selected according to the position of a subject, thus the distance-measuring accuracy can be increased while maintaining electric power at a low level.

Although an example has been given in FIG. 13, in which two light sources out of four light sources are driven at a time simultaneously, the number of light sources and the number of light sources driven simultaneously are not limited to these. The number of light sources may be five or greater, and the number of light sources driven simultaneously may be three or greater. Also, number-of-light-sources-driven determining unit 1201 may drive all light sources simultaneously.

Embodiment 7

Hereinafter, Embodiment 6 will be described using FIG. 14. Embodiment 7 is provided for the purpose of omitting unnecessary processing in application that utilizes the distance-measuring system.

It is to be noted that in the embodiment, only different points from Embodiment 1 will be described, and the same component as in Embodiment 1 is labeled with the same symbol, and a description is omitted.

[7-1. Configuration and Operation]

Figure 14:
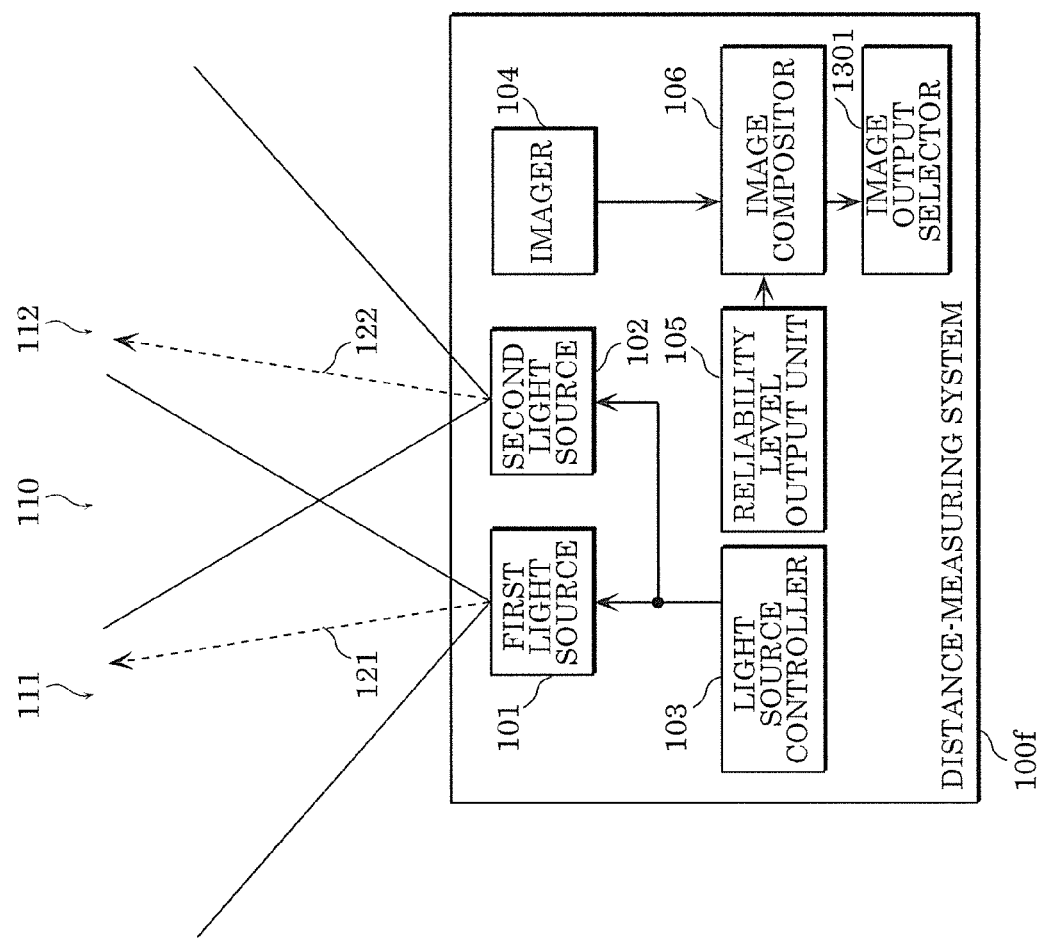
FIG. 14 is a diagram illustrating the configuration of a distance-measuring system according to Embodiment 7.

FIG. 14 is a diagram illustrating the configuration of the distance-measuring system in the embodiment. 100*f* indicates a distance-measuring system, and 1301 indicates an image output selector. The embodiment differs from Embodiment 1 illustrated in FIG. 1 in that the embodiment includes image output selector 1301.

Image output selector 1301 outputs first distance image 301 generated by reflection light emitted by first light source 101 and reflected by a subject, second distance image 302 generated by reflection light emitted by second light source 102 and reflected by a subject, or a necessary distance image in composite distance image 304 to the outside. Other operations are the same as in Embodiment 1.

[7-2. Effect]

As described above, distance-measuring system 100*f* according to the embodiment further includes image output selector 1301. Image output selector 1301 selects and outputs one or more distance images from distance images (first distance image 301 and/or second distance image 302) and composite distance image (304).

With such a distance-measuring system, only necessary distance image can be outputted in application that utilizes the distance-measuring system, thus unnecessary processing can be omitted in a device that performs the application.

Although the present disclosure has been described in detail above, the description is only illustrative of the present disclosure in all respects, and it is not intended to limit the scope of the present disclosure. It goes without saying that various improvements or modifications may be made without departing from the scope of the present disclosure.

For instance, distance-measuring can be performed by combining the embodiments. For instance, reliability level output unit 105*c* may include signal level checker 501 in addition to imaging time checker 601.

Consequently, reliability level output unit 105*c* can calculate a reliability level from an imaging time and a signal level, thus distance-measuring can be performed more accurately. For instance, when the imaging time is the newest, and yet the signal level is lower than or equal to a predetermined value, reliability level output unit 105*c* sets a higher reliability level for the distance image with an older imaging time.

Also, in Embodiment 6, number-of-light-sources-driven determining unit 1201 determines the number of light sources driven. However, without being limited to this, for instance when the pixels are saturated with the number of light sources of two, the intensity of light emitted from the light sources may be adjusted without reducing the number of light sources. In this case, number-of-light-sources-driven determining unit 1201 notifies light source controller 103e of the change in the intensity of the light sources.

Thus, when the pixels are saturated, distance-measuring can be performed with the number of processes of imager 104 and image compositor 106e maintained. Since the intensity of light from the light sources is reduced, electric power can be maintained at a low level. In this case, it is sufficient that the number of light sources be two or greater.

It is to be noted that the general or specific aspects of the present disclosure may be implemented as a system, a device, a method, an integrated circuit, a computer program, a computer-readable CD-ROM, or a non-transitory recording medium such as an optical disk. The program may be pre-stored in the memory medium, or may be supplied to the memory medium via a wide area network including the Internet.

Also, in the embodiments, various modifications, replacements, additions, and omissions may be made within the scope of the claims and the scope of the equivalents thereof.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present disclosure.

INDUSTRIAL APPLICABILITY

The present disclosure is applicable to a distance-measuring system for self-driving vehicles, industrial robots, and automobiles.

What is claimed is:

1. A distance-measuring system comprising:
a plurality of light sources including at least a first light source and a second light source that emit diffused light;
a light source controller that controls timing and an emission period at which and during which the each of the plurality of light sources emit light, and that controls the emission of the first light source and the second light source independently;
an imager that exposes to reflection light emitted by the plurality of light sources and reflected by a subject at times and for exposure periods that are set individually for each of the plurality of light sources, and generates a plurality of distance images corresponding to each of the reflection light in emission areas to which light is emitted by the plurality of light sources, based on a quantity of electric charge of the reflection light, the distance images each indicating a distance to the subject;
a reliability level output unit that outputs a reliability level for the distance for each of the plurality of distance images; and
an image compositor that composites the plurality of distance images generated for the reflection light,
wherein each of the first light source and the second light source has a radiation directivity which differs from each other and from an optical axis of the imager,
the first light source emits the diffused light to a first emission area,
the second light source emits the diffused light to a second emission area,
the first emission area and the second emission area have a partially overlapped area as a common emission area,
the image compositor exclusively selects pixel values to be composited from the plurality of distance images for an outside of the common emission area, determines pixel values to be composited based on the reliability level for the common emission area, and generates a composite distance image, and
the composite distance image corresponds to an emission area greater than each of the first emission area and the second emission area.

2. The distance-measuring system according to claim 1, wherein the reliability level output unit includes a light source priority table that defines a priority of each of the plurality of light sources for each of distance ranges, and
compares distance information indicating a distance for each pixel value of the plurality of distance images with a value of the light source priority table, and selects and outputs the reliability level.

3. The distance-measuring system according to claim 2, wherein the light source priority table is preliminarily set before the plurality of light sources emit the diffused light to the subject.

4. The distance-measuring system according to claim 2, wherein the light source priority table is a table that defines, for each of distance ranges, a distance image corresponding to which one of the plurality of light sources is to be prioritized.

5. The distance-measuring system according to claim 1, wherein the reliability level output unit includes a signal level checker that checks signal levels of the reflection light, and
the signal level checker checks the signal levels of the reflection light corresponding to the plurality of distance images, and generates and outputs a higher reliability level for a greater signal level.

6. The distance-measuring system according to claim 1, wherein the reliability level output unit includes an imaging time checker that checks a time of generation of each of the plurality of distance images, and
the imaging time checker checks the time of generation of each of the plurality of distance images, and generates and outputs a higher reliability level for a newer time of generation.

7. The distance-measuring system according to claim 1, wherein for the common emission area, the image compositor selects pixels to be composited from one of the plurality of distance images, the one distance image having the reliability level which is highest.

8. The distance-measuring system according to claim 1, wherein for the common emission area, the image compositor takes a weighted average of pixels of the plurality of distance images using a value of the reliability level.

9. The distance-measuring system according to claim 1, wherein the common emission area is adjusted to be at a substantially center of the plurality of distance images.

10. The distance-measuring system according to claim 1, wherein the light source controller drives at least two of the plurality of light sources simultaneously.

11. The distance-measuring system according to claim 10, further comprising:
a number-of-light-sources-driven determining unit,
wherein the number-of-light-sources-driven determining unit determines a number of light sources driven simultaneously based on a magnitude of the signal level of the reflection light, and notifies the light source controller of the number of light sources, and the light source controller controls driving of the plurality of light sources based on the number of light sources notified.

12. The distance-measuring system according to claim 1, further comprising:
an image output selector,
wherein the image output selector selects and outputs at least one of the plurality of distance images and the composite distance image.

13. The distance-measuring system according to claim 1, wherein an emission axis of the first light source and an emission axis of the second light source do not intersect.

14. A distance-measuring method comprising:
controlling a plurality of light sources including at least a first light source and a second light source by controlling the first light source and the second light source independently so that diffused light is emitted to only a partial area in common by causing each of the first light source and the second light source to emit at each direction different from each other and from an optical axis of the imager;
exposing an image sensor to reflection light emitted by the plurality of light sources and reflected by a subject at times and for exposure periods that are set individually for each of the plurality of light sources, and generating distance images corresponding to each of the reflection light in emission areas to which light is emitted by the plurality of light sources, based on a quantity of electric charge of the reflection light, the distance images each indicating a distance to the subject;
generating a reliability level of the distance image from the reflection light and the distance image corresponding to the reflection light; and
exclusively selecting pixel values to be composited from a plurality of distance images each of which is the distance image, generated for each of the plurality of light sources, for an area in which the emission ranges of light are not overlapped, determining pixel values to be composited based on the reliability level for an area in which the emission areas of light are overlapped, and generating a composite distance image, wherein
the first light source emits the diffused light to a first emission area,
the second light source emits the diffused light to a second emission area, and
the composite distance image corresponds to an emission area greater than each of the first emission area and the second emission area.

* * * * *